United States Patent [19]

Ainsworth et al.

[11] Patent Number: 4,864,386
[45] Date of Patent: Sep. 5, 1989

[54] DOUBLE DISPLAY MODE FOR DIFFERENTIAL GAIN

[75] Inventors: Kenneth M. Ainsworth; Daniel G. Baker, both of Aloha, Oreg.

[73] Assignee: Tektronix, Inc., Beaverton, Oreg.

[21] Appl. No.: 242,562

[22] Filed: Sep. 12, 1988

[51] Int. Cl.⁴ .......................................... H04N 17/02
[52] U.S. Cl. ..................................................... 358/10
[58] Field of Search .................. 358/10, 19, 21 R, 139

[56] References Cited

U.S. PATENT DOCUMENTS

| | | | |
|---|---|---|---|
| 3,534,155 | 10/1970 | Rhodes | 358/10 |
| 4,354,243 | 10/1982 | Ryan | 358/10 |
| 4,387,551 | 5/1986 | Penney | 358/10 |
| 4,607,288 | 8/1986 | Freyberger | 358/10 |

Primary Examiner—Tommy P. Chin
Attorney, Agent, or Firm—Francis I. Gray

[57] ABSTRACT

A double display mode for differential gain provides the capability of accurately determining the differential gain of a video system in response to a video test signal without using graticules on a display device. A detected chrominance peak level signal is displayed as a positive and a negative trace on the display device. An offset signal is added to the detected chrominance peak level signal to obtain an overlay on the display device of a first selected point of the traces, and then the offset signal is varied to obtain an overlay on the display device of a second selected point of the traces. The difference in values of the offset signal between the two selected points are used to determine the differential gain of the video system.

9 Claims, 2 Drawing Sheets

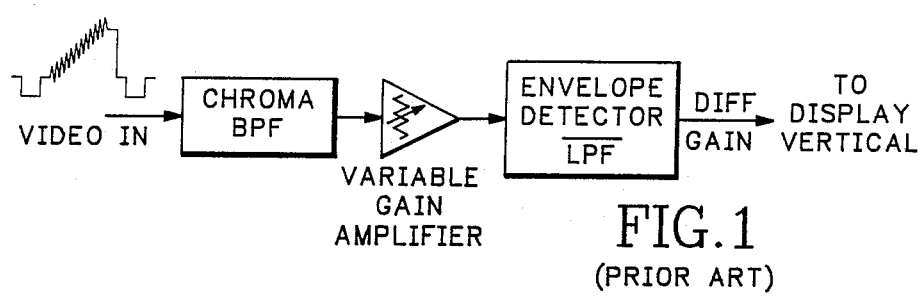
FIG. 1
(PRIOR ART)
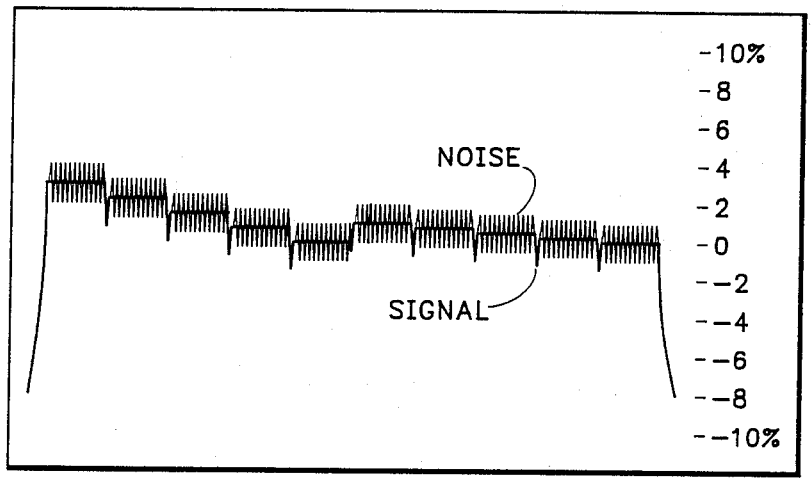
(MODULATED STAIRCASE TEST SIGNAL)
FIG. 2
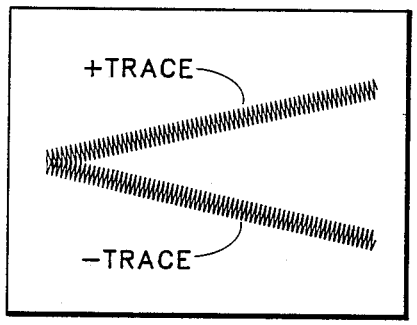   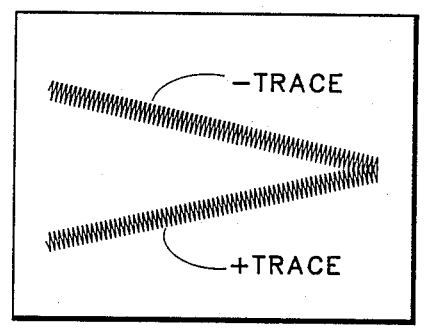
FIG.5(a)                FIG.5(b)

DOUBLE DISPLAY MODE FOR DIFFERENTIAL GAIN

BACKGROUND OF THE INVENTION

The present invention relates to the measurement of parameters of a video system, and more particularly to a double display mode for determining differential gain of the video system in response to a video test signal quantitatively without using display graticules.

In a video system a significant chrominance signal distortion in a video signal is differential gain. Differential gain is a change in color subcarrier amplitude as a function of luminance so that in the reproduced color picture the saturation is distorted in the areas between the light and dark portions of the scene. To measure this parameter a modulated ramp or staircase video test signal is input to the video system. The video signal output from the video system is passed through a chrominance bandpass filter, amplified by a large gain factor, and envelope detected as indicated in FIG. 1 to produce a differential gain signal for display. The envelope detector includes a lowpass filter to eliminate high frequency residuals while maintaining the signal spectrum of the differential gain signal. As indicated in FIG. 2 the display includes graticules that overlay the differential gain signal so that deviations from the ideal constant d.c. voltage level of the signal may be determined in percentage values. The most accurate measurements to date have been approximately one percent, as exemplified by the 520A NTSC Vectorscope manufactured by Tektronix, Inc., Beaverton, OR, U.S.A. However in the presence of noise it is extremely difficult to make such accurate measurements of small differential gain errors using the display graticules.

A technique that has been used to measure differential phase errors is exemplified in C. W. Rhodes U.S. Pat. No. 3,534,155 issued Oct. 13, 1970 entitled "Measurement of Characteristic of Electrical Signal by Positioning Measured Positions of a Corresponding Pair of Opposite Phase Signals in Coincidence". A modulated staircase test signal that had been passed through a video system being tested is demodulated by a subcarrier signal that is alternately switched 180 degrees in phase to produce a positive and a negative differential phase signal for display. An uncalibrated phase shifter is adjusted until desired corresponding points on each differential phase signal are shifted vertically on the display to overlay each other. Then a calibrated phase shifter is adjusted until second corresponding desired points on each differential phase signal are adjusted to overlay each other, and the phase difference between the two points is read directly from the calibrated phase shifter. This technique required the phase shifting of the regenerated subcarrier frequency, but the phase of the subcarrier frequency is not used in obtaining a differential gain signal so this technique has not been applied to differential gain measurements.

What is desired is a double display mode for differential gain measurements that eliminates the reliance upon graticules for making quantitative measurements while increasing the accuracy of the measurements.

SUMMARY OF THE INVENTION

Accordingly the present invention provides a double display mode for differential gain that displays mirror image differential gain signals. A microprocessor controlled variable is added to the differential gain signals to bring one of two corresponding opposite extreme amplitude points of the differential gain signals into registration so that they overlay each other. Then the microprocessor controlled variable is adjusted until the opposite corresponding extreme amplitude points of the differential gain signals overlay each other, and the difference in values of the variable is converted into a percentage gain differential value for display alphanumerically without the need for display graticules.

The objects, advantages and novel features of the present invention are apparent from the following detailed description when read in conjunction with the appended claims and attached drawing.

BRIEF DESCRIPTION OF THE DRAWING

FIG. 1 is a block diagram view of a prior art differential gain measurement system.

FIG. 2 is a graphic view of a differential gain signal display.

FIGS. 5(a) and 5(b) are graphic differential the double display mode according to the present invention.

DESCRIPTION OF THE PREFERRED EMBODIMENT

Figure 3:
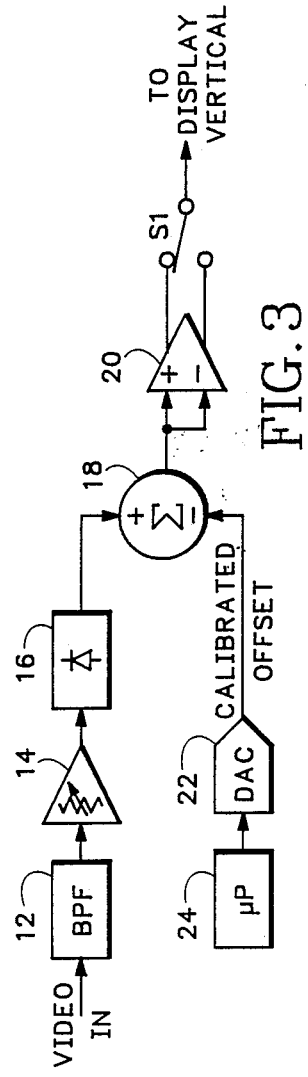
FIG. 3 is a block diagram view of a first embodiment of a double display mode for differential gain according to the present invention.

Referring now to FIG. 3 an input video signal from a video system under test is input to a chrominance bandpass filter 12 and thence to a variable gain amplifier 14. The output of the variable gain amplifier 14 is input to an envelope detector 16 to recover the chrominance peaks of the subcarrier signal which should all be equal at all luminance values. The envelope detector 16 includes an output lowpass filter to attenuate high frequency residuals. The resulting differential gain signal from the envelope detector 16 is input to a combining circuit 18. The output of the combining circuit 18 is input to a differential amplifier 20 that has two outputs, one of which is a positive output signal and the other of which is an inverted, or negative, output signal. The two outputs from the differential amplifier 20 are input to a switch S1 that alternates at a line rate or a field rate, or any other rate compatible with the information being displayed, to produce a mirror image output signal for display. The other input to the combining circuit 18 is from a digital to analog converter (DAC) 22 that is loaded with a digital word from a microprocessor 24. The output of the DAC 22 is an offset voltage for combination with the differential gain signal to essentially adjust the d.c. level of the differential gain signal on the display.

Figure 4:
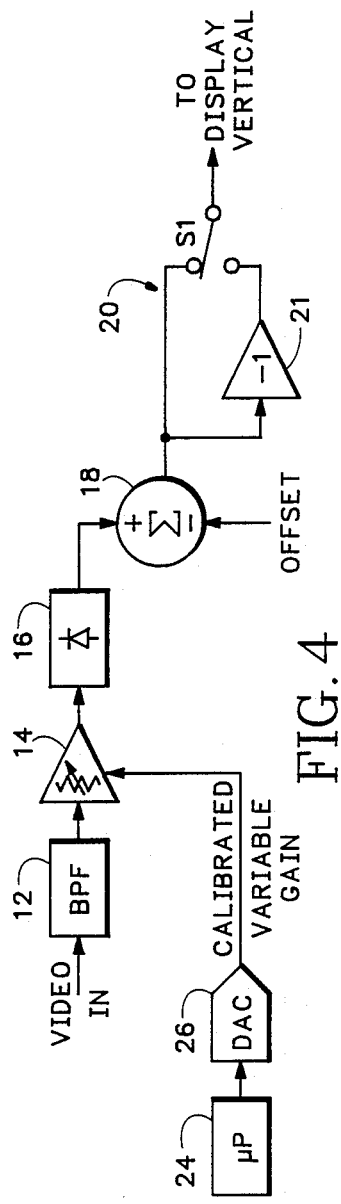
FIG. 4 is a block diagram view of a second embodiment of a double display mode for differential gain according to the present invention.

An alternative embodiment is illustrated in FIG. 4 where the differential amplifier 20 is a direct input from the combining circuit 18 one input terminal of the switch S1, and an inverting amplifier 21 inserted between the output of the combining circuit and the other input terminal of the switch. The DAC 22 is replaced with a fixed offset value. A second DAC 26 is provided with a variable gain word from the microprocessor. The output of the second DAC 26 is input to the variable gain amplifier 14 as a calibrated variable gain voltage.

In operation as illustrated in FIGS. 5(a) and 5(b) the differential gain signal is displayed as a positive trace and a negative trace that are mirror images and separated from each other by an amount that the output of the envelope detector 16 plus the offset signal from the DAC 22 is different from zero. For the embodiment of FIG. 3 the input to the DAC 22 from the microprocessor 24 is adjusted until the lowest amplitude point of the positive trace overlays the highest amplitude point of the negative trace, i.e., the trace amplitude plus the offset equal zero or the trace amplitude equals the offset. For a field rate switching rate for the switch S1 the traces flicker at all points except where the traces overlay each other. This establishes a reference value that is stored in the microprocessor 24. Then the input to the DAC 22 from the microprocessor 24 is adjusted until the highest amplitude of the positive trace overlays the lowest amplitude of the negative trace. This establishes a difference value that is stored in the microprocessor 24. The microprocessor 24 then determines the differential gain for the video system under test as the percent change in the offset based upon a difference between the reference and difference values, which differential gain is displayed as a numerical value of an alphanumeric display that may be either the same or a different display device, as is well known to those of ordinary skill in the art. For an envelope detector 16 that has a nonlinear output or for a calibrated offset that is some fraction of the total offset applied, then appropriate scaling or a lookup table may be used to calibrate the offset in terms of percent differential gain.

Alternatively for the embodiment of FIG. 4 the offset input to the combining circuit 18 is fixed. The fixed offset is chosen so that the output of the envelope detector 16 plus the offset signal equals zero when the calibrated variable gain signal from the second DAC 26 is at the center of its range. The operation is identical to that described with respect to FIG. 3 except that the calibrated variable gain signal is used to overlay the selected portions of the display. The measured differential gain is equal to the percent change of the calibrated variable gain signal. Thus both implementations are essentially the same, with the only difference being the point in the signal path where the offset is applied. Since the envelope detector 16 converts a sine wave into a d.c. voltage representative of the amplitude of the sine wave, a gain change ahead of the envelope detector maps to a change in d.c. level at the output of the envelope detector.

Thus the present invention provides a double display mode for differential gain by adding an offset to the output of the envelope detector, displaying the output as a positive and negative trace, and inserting a calibrated offset into the signal path to cause selected points of the traces to overlay, the difference in offset values between the selected points being used to determine differential gain for display as an alphanumeric value.

What is claimed is:

1. An apparatus for measuring differential gain of a video system in response to a video test signal comprising:
   means for detecting a chrominance peak level signal from a video signal output from the video system corresponding to the video test signal;
   means for displaying the chrominance peak level signal as a positive and a negative trace on a display device; and
   means for applying a calibrated offset value to the chrominance peak level signal so that selected points of the traces overlay on the display device, the differential gain being determined from the difference in values of the calibrated offset value between the selected points.

2. An apparatus as recited in claim 1 wherein the displaying means comprises:
   a differential amplifier circuit having the chrominance peak level signal as an input and a noninverted and an inverted peak signal as outputs, the noninverted peak signal corresponding to the positive trace and the inverted peak signal corresponding to the negative trace; and
   means for switching between the outputs of the differential amplifier circuit at a rate compatible with the video test signal.

3. An apparatus as recited in claim 1 wherein the applying means comprises:
   means for combining the calibrated offset signal with the chrominance peak level signal prior to input to the displaying means; means for varying the calibrated offset signal so that the selected points overlay each other on the display device, the values of the calibrated offset signal corresponding to such overlay points being retained; and
   means for determining from the retained values of the calibrated offset signal the differential gain.

4. An apparatus as recited in claim 1 wherein the applying means comprises;
   means for amplifying the video signal by a calibrated variable gain signal prior o input to the detecting means;
   means for varying the calibrated variable gain signal so that the selected points overlay each other on the display device, the values of the calibrated variable gain signal occurring when the selected points overlay each other being retained; and
   means for determining from the retained values of the calibrated variable gain signal the differential gain.

5. An improved apparatus for measuring differential gain of a video system in response to a video test signal, the apparatus having an input chrominance bandpass filter to which a video signal output from the video system is applied, a variable gain stage to amplify the output of the bandpass filter, and an envelope detector to produce a peak level signal from the output of the variable gain stage, wherein the improvement comprises:
   means for displaying the peak level signal as a positive and a negative trace on a display device; and
   means for applying a calibrated offset signal to the peak level signal so that selected points of the traces overlay each other, the values of the calibrated offset signal occurring when the selected points overlay each other being used to determine the differential gain between the selected points.

6. An improved apparatus as recited in claim 5 wherein the displaying means comprises:
   a differential amplifier circuit having the peak level signal as an input and a noninverted and an inverted peak signal as outputs, the noninverted peak signal corresponding to the positive trace and the inverted peak signal corresponding to the negative trace; and
   means for switching between the outputs of the differential amplifier circuit at a rate compatible with the video test signal.

7. An improved apparatus as recited in claim 5 wherein the applying means comprises:
  means for combining the calibrated offset signal with the peak level signal prior to input to the displaying means;
  means for varying the calibrated offset signal so that the selected points overlay each other on the display device, the values of the calibrated offset signal corresponding to such overlay points being retained; and
  means for determining from the retained values of the calibrated offset signal the differential gain.

8. An improved apparatus as recited in claim 5 wherein the applying means comprises;
  means for amplifying the video signal by a calibrated variable gain signal prior to input to the detecting means;
  means for varying the calibrated variable gain signal so that the selected points overlay each other on the display device, the values of the calibrated variable gain signal occurring when the selected points overlay each other being retained; and
  means for determining from the retained values of the calibrated variable gain signal the differential gain.

9. An improved apparatus as recited in claim 5 wherein the switching means rate comprises a field rate so that the traces flicker except at the points where the traces overlay each other.

* * * * *